US012703268B2

(12) United States Patent
Duque et al.

(10) Patent No.: US 12,703,268 B2
(45) Date of Patent: Aug. 11, 2026

(54) METHOD AND SYSTEM FOR MANAGING THE HEAT TREATMENT OF AT LEAST ONE ELEMENT OF AN ELECTRIC DRIVE TRAIN OF AN ELECTRIC OR HYBRID MOTOR VEHICLE

(71) Applicant: AMPERE S.A.S., Boulogne Billancourt (FR)

(72) Inventors: Manuela Duque, Courtaboeuf (FR); Nicolas Hollette, Courtaboeuf (FR)

(73) Assignee: AMPERE S.A.S., Boulogne Billancourt (FR)

( * ) Notice: Subject to any disclaimer, the term of this patent is extended or adjusted under 35 U.S.C. 154(b) by 144 days.

(21) Appl. No.: 18/699,075

(22) PCT Filed: Sep. 30, 2022

(86) PCT No.: PCT/EP2022/077411
§ 371 (c)(1),
(2) Date: Apr. 5, 2024

(87) PCT Pub. No.: WO2023/061788
PCT Pub. Date: Apr. 20, 2023

(65) Prior Publication Data

US 2024/0409005 A1 Dec. 12, 2024

(30) Foreign Application Priority Data

Oct. 12, 2021 (FR) ...................................... 2110809

(51) Int. Cl.
*B60L 58/26* (2019.01)
*B60L 58/24* (2019.01)

(52) U.S. Cl.
CPC ............... *B60L 58/26* (2019.02); *B60L 58/24* (2019.02); *B60L 2240/425* (2013.01); *B60L 2240/545* (2013.01)

(58) Field of Classification Search
CPC ...... B60L 58/26; B60L 58/12; B60L 2240/12; B60L 2240/425; B60L 2240/545;
(Continued)

(56) References Cited

U.S. PATENT DOCUMENTS 10,005,373 B2 * 6/2018 Morikawa ............... H02J 7/977
10,315,529 B2 * 6/2019 Araki ...................... B60L 53/66
(Continued)

FOREIGN PATENT DOCUMENTS

DE 10 2018 128 695 A1 5/2020
DE 10 2019 118 415 A1 1/2021
(Continued)

OTHER PUBLICATIONS

WO-2018189438-A1 original and translation (Year: 2018).*
(Continued)

*Primary Examiner* — Frederick M Brushaber
(74) *Attorney, Agent, or Firm* — Oblon, McClelland, Maier & Neustadt, L.L.P.

(57) ABSTRACT

The invention relates to a management system and method for the heat treatment of at least one element of a drive train of an electric or hybrid motor vehicle so as to optimize the performance of the vehicle for intensive use being carried out or planned.

13 Claims, 4 Drawing Sheets

(58) Field of Classification Search
CPC .. B60L 2250/20; B60L 58/24; B60L 2260/16; B60W 20/00; B60W 2510/087; B60W 2510/246; B60W 2520/10; B60W 2540/043; B60W 2540/18; H02P 29/60
See application file for complete search history.

(56) References Cited

U.S. PATENT DOCUMENTS

| | | | | |
|---|---|---|---|---|
| 10,439,417 | B2 * | 10/2019 | Murata | B60L 53/14 |
| 10,468,892 | B2 * | 11/2019 | Park | B60L 3/0046 |
| 11,247,583 | B2 * | 2/2022 | Bellino | H01M 10/633 |
| 2011/0316486 | A1 * | 12/2011 | Inaba | H01M 10/48 320/150 |
| 2016/0214495 | A1 * | 7/2016 | Murata | B60L 53/64 |
| 2017/0365891 | A1 | 12/2017 | Recouvreur et al. | |
| 2020/0343601 | A1 * | 10/2020 | Carlson | B60L 58/26 |
| 2020/0361280 | A1 * | 11/2020 | Hashimoto | B60H 1/00885 |
| 2021/0031654 | A1 | 2/2021 | Vizzini et al. | |

FOREIGN PATENT DOCUMENTS

| | | | | |
|---|---|---|---|---|
| EP | 3 771 593 | A1 | 2/2021 | |
| WO | WO 2016/097541 | A1 | 6/2016 | |
| WO | WO-2018189438 | A1 * | 10/2018 | B60L 58/27 |

OTHER PUBLICATIONS

International Search Report mailed on Jan. 17, 2023 in PCT/EP2022/077411 filed on Sep. 30, 2022 (citing references 1-3 & 15-19 therein, 2 pages).
Preliminary French Search Report dated Jul. 9, 2022 in French Application 2110809 filed on Oct. 12, 2021 (citing references 1-3 & 15-19 therein, 3 pages, with Translation of Categories).

* cited by examiner

100
E01
E01a
Selection
E01b
Programming
E01c
Driver Identification
E01d/E01dd'
Parameter Detection
E01e
Journey or Location Detection
E02
Temperature Determination
E03
Heat Treatment
E04
Stop Method
E14
Estimate Provisional Time
E14'
Calculate Time Remaining
E15
Display Temperature

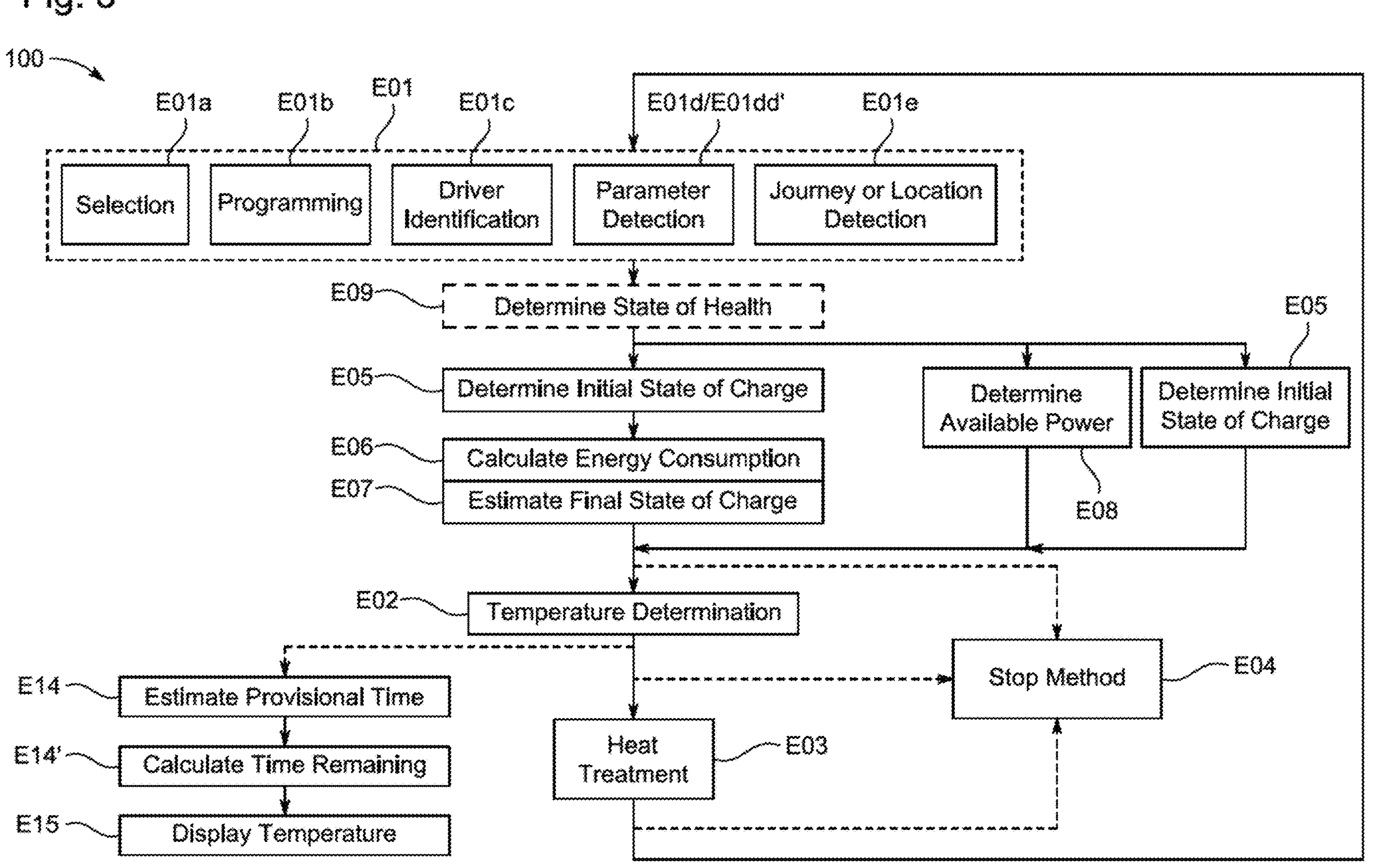

Fig. 3
100
E01a
E01b
E01
E01c
E01d/E01dd'
E01e
Selection
Programming
Driver Identification
Parameter Detection
Journey or Location Detection
E09
Determine State of Health
E05
Determine Initial State of Charge
E06
Calculate Energy Consumption
E07
Estimate Final State of Charge
Determine Available Power
E08
E05
Determine Initial State of Charge
E02
Temperature Determination
Stop Method
E04
E14
Estimate Provisional Time
E14'
Calculate Time Remaining
E15
Display Temperature
Heat Treatment
E03

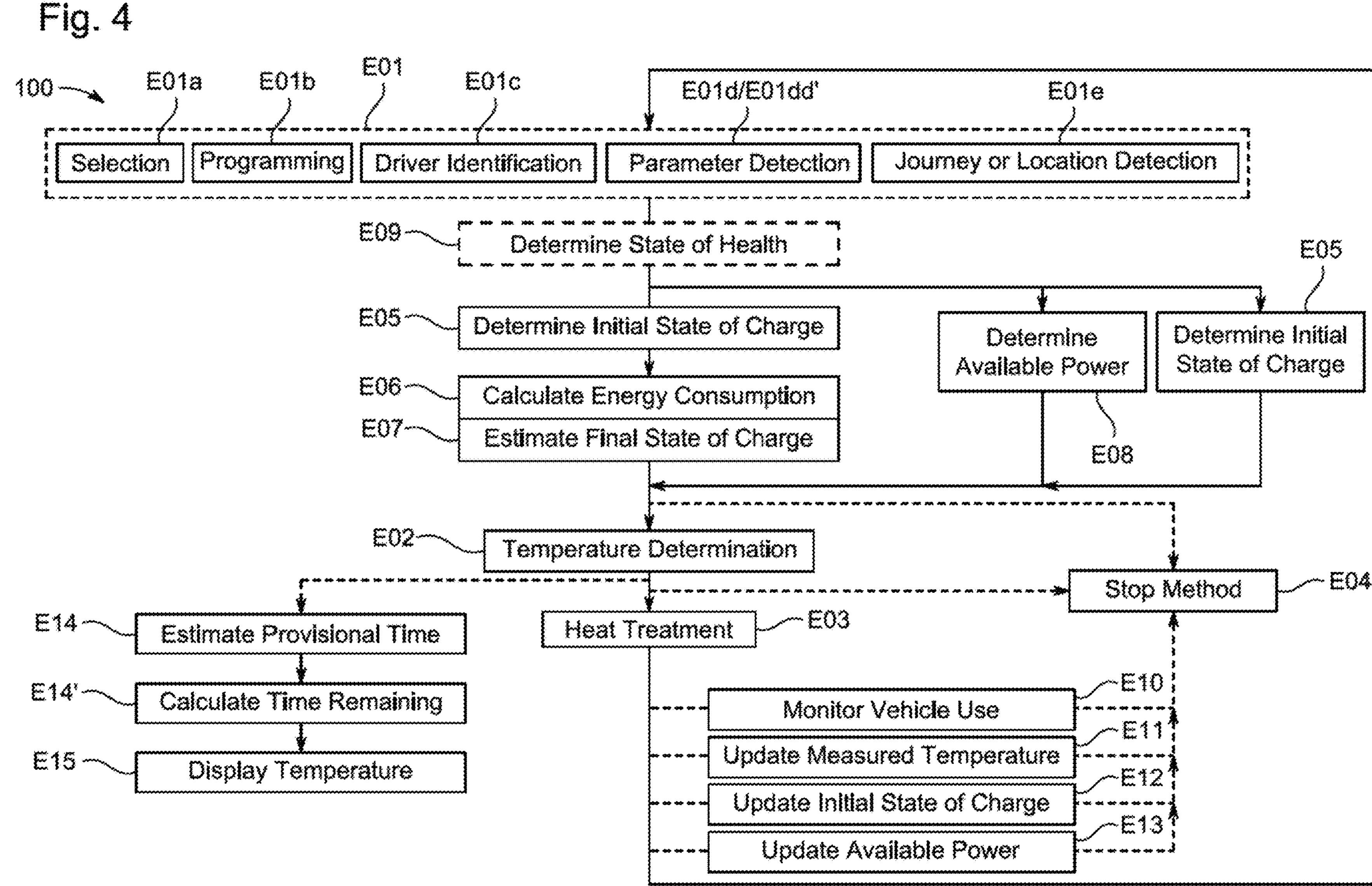
Fig. 4
100
E01a
E01b
E01
E01c
E01d/E01dd'
E01e
Selection
Programming
Driver Identification
Parameter Detection
Journey or Location Detection
E09
Determine State of Health
E05
Determine Initial State of Charge
E06
Calculate Energy Consumption
E07
Estimate Final State of Charge
Determine Available Power
E08
E05
Determine Initial State of Charge
E02
Temperature Determination
Stop Method
E04
E14
Estimate Provisional Time
E14'
Calculate Time Remaining
E15
Display Temperature
Heat Treatment
E03
Monitor Vehicle Use
E10
Update Measured Temperature
E11
Update Initial State of Charge
E12
Update Available Power
E13

METHOD AND SYSTEM FOR MANAGING THE HEAT TREATMENT OF AT LEAST ONE ELEMENT OF AN ELECTRIC DRIVE TRAIN OF AN ELECTRIC OR HYBRID MOTOR VEHICLE

BACKGROUND

The invention relates to a method and a system for managing the heat treatment of at least one element of an electric drive train, notably an electric motor and/or at least one electric battery module, of an electric or hybrid vehicle. The invention also relates to a motor vehicle equipped with said system and/or implementing the methods mentioned.

In the electric drive train, the various electronic or mechanical elements have an energy efficiency that is dependent on their temperature. Each of these elements has ideal operating temperatures that make it possible to achieve the best performance levels. Maintaining the various elements of the drive train in the regions of these target temperatures is particularly essential to meet the needs of intensive uses of the vehicle such as sport modes.

Conventionally, hybrid or electric vehicles are equipped with one or more cooling systems of at least one element of the electric drive train, notably of at least one battery module, also called "battery" or "battery pack", aiming to limit the heating-up of these elements to temperatures likely to affect the performance levels thereof and provoke premature wear thereof.

The known cooling systems are particularly focused on the heat treatment of the battery module of the vehicle, in particular during fast or ultrafast charging phases, "Fast charge" and "Ultrafast charge" respectively. These cooling systems and the implementation thereof are not necessarily sufficient for the heat treatment of the drive train in the case of intensive use of the vehicle. Indeed, with such a use demanding significant powers and performance levels on the part of the various elements of the drive train, the latter tend to heat up rapidly. The implementation of a heat treatment of these elements only when a heating-up likely to affect their durability is detected does not make it possible to ensure optimal performance levels over the entire duration of execution of such a use. The result thereof, on the one hand, is that the performance level of the various elements of the drive train is limited for an intensive use and, on the other hand, is that the duration of execution of such a use is thereby limited.

BRIEF SUMMARY

The invention falls within this context and aims to provide a method and a system for managing the heat treatment of at least one element of the electric drive train that remedy the abovementioned drawbacks. In particular, the invention aims to ensure a refined heat treatment of the electric drive train that makes it possible to anticipate the needs of an intensive use of the vehicle so as to optimize the performance levels of the vehicle.

The invention relates to a method for managing the heat treatment of at least one element of an electric drive train, notably a train comprising an electric motor and at least one electric battery module, of an electric or hybrid vehicle equipped with at least one electric battery module and at least one heat treatment system of at least one of the elements of the electric drive train. The method comprises a step of detection of an activation, manual or automatic, of an intensive use of the vehicle currently being executed or planned, and the method further comprises, when such an intensive use is detected:

- a step of determination, notably of measurement, of at least one temperature of the at least one element of the electric drive train and a step of comparison of the at least one temperature with at least one target optimal operating temperature specific to the at least one element of the electric drive train so as to detect a deviation relative to the at least one target temperature;
- a step of heat treatment of the at least one element of the electric drive train, implemented when a deviation is detected relative to the at least one target temperature specific to the at least one element of the drive train.

The method can comprise a step of determination of an initial state of charge of the at least one battery module, the method being stopped early, prior to the execution of the heat treatment step, when the determined initial state of charge of the at least one battery module is below a predetermined threshold.

The method can comprise:

- a step of calculation of an electrical energy consumption of the electric battery module required for the implementation of the heat treatment of the at least one element so as to correct the detected deviation specific to the at least one element of the drive train;
- a step of estimation of a provisional final state of charge of the at least one battery module as a function of the initial state of charge and of the calculated electrical energy consumption.

The method can then be stopped early, prior to the execution of the heat treatment step, when the calculated provisional state of charge is below a predetermined threshold.

The method can comprise, prior to the heat treatment of the at least one element of the drive train, a step of determination of an availability of power of the at least one battery module that can be allocated to the at least one heat treatment system, the availability of power being determined as a function of at least one parameter internal to the vehicle and/or as a function of at least one parameter external to the vehicle, the method being stopped early, prior to the execution of the heat treatment step, when the availability of power of the at least one battery module is below a predetermined threshold.

The method can comprise at least one step of monitoring, at the same time as and/or subsequent to the heat treatment step, of the use of the vehicle, the method being stopped early when no intensive use, currently being executed or planned, is detected.

The method can be stopped when the detected temperature deviation is less than 2° C.

Notably, when a deviation relative to the at least one target temperature is detected, the method can comprise a step of estimation of a provisional time necessary for the at least one heat treatment system to correct such a deviation.

The step of detection of an activation of an intensive use, currently being executed or planned, of the vehicle can comprise at least one out of:

- a sub-step of detection of a journey and/or of a location specific to a current or planned intensive use via a location means of the vehicle or a connected device;
- a sub-step of detection of at least one running parameter of the vehicle by a sensor, notably a longitudinal speed, a stressing of a pedal, a variation of angle of a steering wheel or a transverse acceleration, characteristic of a current intensive use;

a sub-step of selection or of programming of an intensive driving mode preprogrammed in the vehicle by the user via a human-machine interface embedded in the vehicle and/or via a connected device;

a sub-step of programming, by the user, of the subsequent execution of a planned intensive use of the vehicle via a human-machine interface embedded in the vehicle and/or via a connected device;

a sub-step of identification of a driver and/or of a driver profile, stored in a memory unit of the vehicle, associated with an intensive driving profile.

The invention also relates to a system for managing the heat treatment of at least one element of a drive train of a vehicle equipped with at least one heat treatment system, the system comprising hardware and/or software elements implementing the management method according to the invention, the hardware elements comprising at least one processing unit, a memory unit, at least one sensor of temperature of the at least one element of the drive train and at least one means for detecting an intensive use of the vehicle.

The invention also relates to a hybrid or electric motor vehicle comprising at least one electric battery module capable of powering at least one element of an electric drive train of the vehicle and at least one heat treatment system of said at least one element, the vehicle being, furthermore, equipped with a management system as explained above.

The invention also extends to a computer program product comprising program code instructions stored on a computer-readable medium for implementing the steps of the management method according to the invention when said program runs on a computer. Alternatively, the computer program product can be downloadable from a communication network and/or stored on a computer-readable data medium and/or executable by a computer, the latter comprising instructions which, when the program is run by the computer, cause the latter to implement the method according to the invention.

The invention can also relate to a data storage medium, that can be read by a computer, on which is stored a computer program comprising program code instructions for implementing the method according to the invention or on a computer-readable storage medium comprising instructions which, when they are executed by a computer, cause the latter to implement the securing method.

The invention can finally relate to a signal from a data medium containing the computer program product as explained previously.

Other details, features and advantages will emerge more clearly on reading the detailed description given hereinbelow, in an indicative and nonlimiting manner, in relation to the various exemplary embodiments illustrated in the following figures:

BRIEF DESCRIPTION OF THE DRAWINGS

FIG. 3 is a flow diagram of a second example of execution of the heat treatment management method.

FIG. 4 is a flow diagram of a third example of execution of the heat treatment management method.

DETAILED DESCRIPTION

Figure 1:
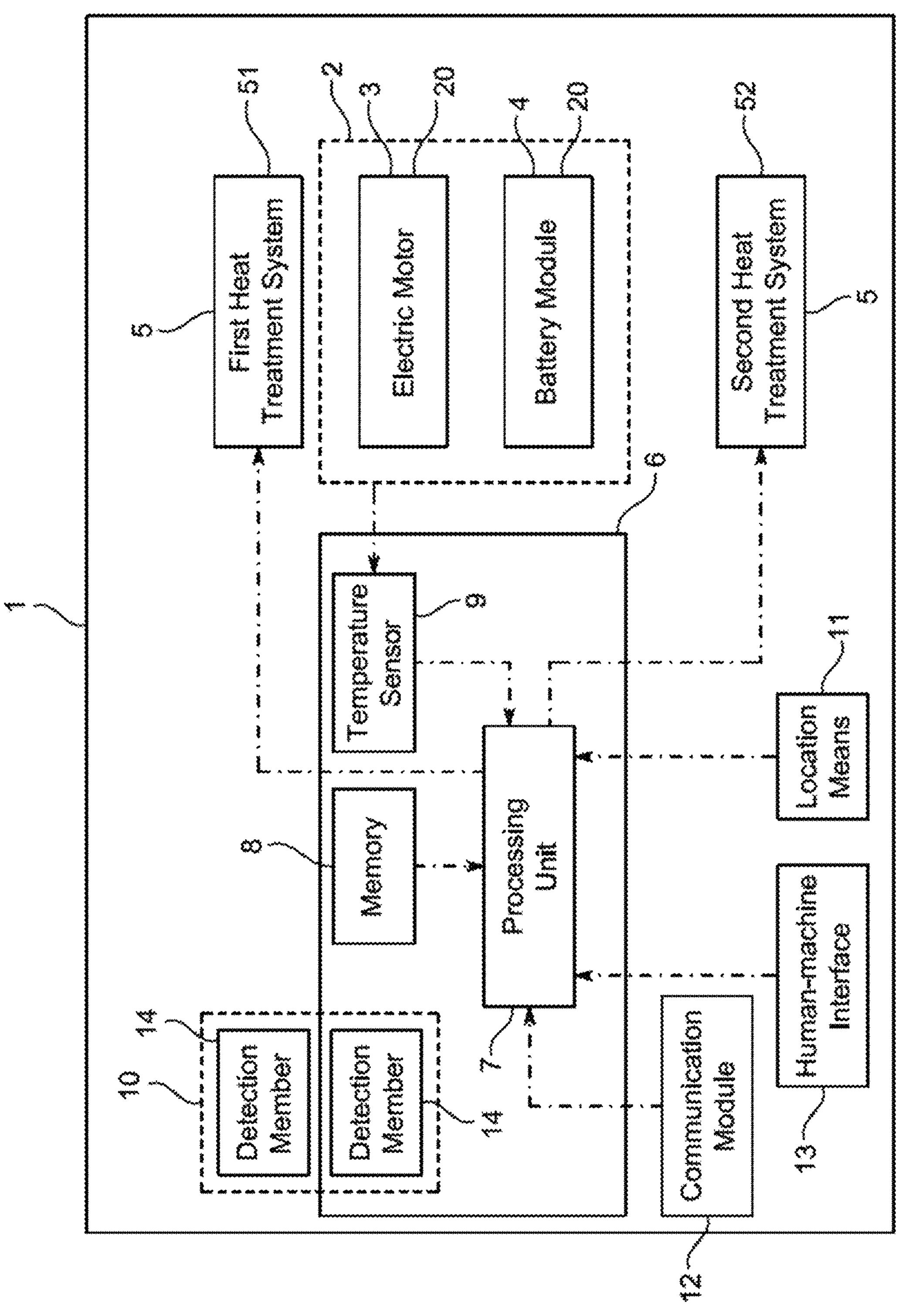
FIG. 1 schematically represents an embodiment of a vehicle equipped with a system for managing the heat treatment of at least one element of the drive train.

FIG. 1 schematically illustrates an electric or hybrid motor vehicle 1. The vehicle can be of any kind, that is to say it can be a passenger vehicle, a utility vehicle, a truck or a bus. Also, the vehicle 1 can be an autonomous or non-autonomous vehicle.

The vehicle is equipped with an electric drive train 2 comprising a plurality of elements 20, notably an electric motor 3 and at least one electric battery module 4, also qualified as "battery", "electrical energy storage device" or even "battery pack". In the example illustrated, the vehicle comprises a battery module 4, but the vehicle will nevertheless be able to comprise a plurality of said modules. The battery module 4 is notably intended to power one or more elements of the electric drive train 2 of the vehicle, for example the electric motor 3. The drive train 2 further comprises additional members, not represented, such as electronic components that are likely to rise in temperature, and such members are notably attached to at least one of the battery module 4 or the electric motor 3. In other words, all the electronic or mechanical elements of the drive train 2 are considered here to be likely to be actively treated by at least one heat treatment system.

Also, the vehicle 1 is equipped with one or more heat treatment systems 5 of at least one element 20 of the electric drive train 2. According to an exemplary embodiment that is not represented, the vehicle can comprise a heat treatment system 5 configured to ensure the heat treatment of the electric motor 3 and/or of the battery module 4 at a given moment. According to the preferred embodiment illustrated, the vehicle comprises a first heat treatment system 51, configured to ensure the heat treatment of the electric motor 3, and a second heat treatment system 52, distinct from the first heat treatment system 51, configured to implement the heat treatment of the battery module 4. Advantageously, the first heat treatment system 51 and the second heat treatment system 52 are able to operate independently of one another. More advantageously, the first and second heat treatment systems can be linked to one another in order to offer an increased cooling capacity, which makes it possible notably to meet cooling conditions under outside temperature conditions that are more restrictive in terms of need for heat treatment of the components of the electric drive train.

Optionally but preferentially, the vehicle can be equipped with an installation, not represented, for ventilation, heating and/or air-conditioning of the vehicle interior allowing the heat treatment of a flow of air sent to an interior of the vehicle so as to heat it up or cool it down. In particular, at least one of the first heat treatment system 51 or the second heat treatment system 52 can be included in said installation.

The vehicle 1 also comprises a system 6 for managing the heat treatment of at least one element 20 of the drive train. The management system 6 comprises at least one data processing unit 7, at least one memory unit 8 and at least one temperature sensor 9, capable of measuring the temperature of at least one element 20 of the drive train 2 as explained previously, for example the temperature of the electric motor 3 and/or the temperature of the battery module 4. The management system 6 comprises, in addition, at least one means 10 for detecting an intensive use of the vehicle. "Intensive use" is understood to mean a use of the vehicle requiring performance levels greater than a normal use, that is to say strained running over a determined period of time. Such a use can, in a nonlimiting manner, be included in a particular mode of operation of the vehicle, preprogrammed, conventionally qualified as "sport", "sport+" or "boost" mode or any other similar designation. Additionally or alternatively, an intensive use can, as explained further hereinbelow, be observed via the history of parameters of the vehicle such as the longitudinal speeds reached, the average pedal position, the pedal activity or the transverse acceleration.

Optionally, the management system 6 can also comprise all or part of the following hardware and/or software elements:

- a means 11 for locating the position of the vehicle in a road infrastructure;
- a communication module 12 of the vehicle communicating with a connected device;
- a human-machine interface 13, comprising a screen for example.

The processing unit 7 can comprise the memory unit 8 and a computer comprising hardware and software resources, notably at least one processor, or microprocessor, cooperating with the memory unit. This computer is able to execute instructions for the implementation of a computer program.

The location means 11 makes it possible for the vehicle to be located in the road infrastructure. It incorporates, for example, an approximate vehicle location system and/or a high-definition mapping of the road infrastructure. Notably, the approximate location of the vehicle can be supplied by a system of GPS type, GPS being the acronym for "Global Positioning System". The approximate location of the vehicle makes it possible to extract from a mapping database the information concerning the road infrastructure within a radius of a few hundreds of meters around the approximate position of the vehicle. Alternatively or in addition, the location means 11 can be a location system embedded in the vehicle, which incorporates the movements of the vehicle 1 at all times.

The communication module 12 is configured so as to detect and/or receive an outgoing stream of data transmitted by a connected device, for example of telephone, electronic organizer or watch type, by means of a low-frequency or high-frequency wireless link. It can, for example, be a wireless link based on "cellular", "Bluetooth" or "Wi-Fi" technologies. Alternatively or in combination, the communication module 12 can be linked to a remote server in order to receive and/or transmit information relating to conditions outside the vehicle, for example relating to traffic conditions, as a function of the location of the vehicle.

As explained further hereinbelow, the means 10 for detecting an intensive use of the vehicle can comprise one or more detection members 14 that make it possible to detect an intensive use triggered automatically or manually on the one hand, and an intensive use currently being executed or planned, that is to say the execution of which is planned within a predefined time interval, on the other hand. Such members 14 can notably perform measurements relative to at least one parameter of the vehicle which are then transmitted to the processing unit 7. Such measurements can be performed, for example, in real-time or at regular time intervals. Notably, the detection members 14 can perform, in a nonlimiting manner, measurements relating to:

- the longitudinal speed of the vehicle;
- the acceleration and/or the slowing-down of the vehicle;
- the transverse acceleration of the vehicle;
- the angle of the steering wheel;
- the average position of the different pedals and/or the average activity of said pedals, for example a pressure exerted on the brake pedal.

Furthermore, the detection means 10 can receive data from the communication module 12, from the human-machine interface 13 and/or from the location means 11.

Different modes of execution of the method 100 for managing the heat treatment of at least one element 20 of the drive train 2 of the vehicle is described hereinbelow with reference to FIGS. 2 to 4.

The method 100 comprises, in a first stage, a step of detection E01 of an intensive use of the vehicle currently being executed or planned. "Currently being executed" is understood to mean that the intensive use is triggered or used at an instant to at which the detection step E01 is implemented.

"Planned" is understood to mean that the intensive use is programmed at an instant $t_n$ subsequent to the instant $t_0$. For example, as explained further hereinbelow, such a planned use can result from instructions relating to a future intensive used sent to the vehicle, in particular to the communication module 12, via a connected device at the instant to.

The result thereof is that the method according to the invention can be triggered in various vehicle life situations for which the vehicle is powered, notably in a running phase, when stopped or even during charging phases.

The management system 6 can notably detect a manual activation of an intensive use, that is to say an activation initiated by the driver or the user, for an immediate use, that is to say at $t_0$. For example, the method can comprise a sub-step of selection E01*a*, during a running phase or when stopped, of an intensive driving mode, notably "sport", preprogrammed in the vehicle. This selection can be made by the user via the human-machine interface 13 with which the vehicle is equipped, then corresponding to a so-called "on-board" activation, and/or via a connected device, notably via an application specific to the vehicle, corresponding to an "off-board" activation. The user can thus select the "intensive" mode from among a plurality of modes offered, for example "comfort" or "eco" modes that are conventionally offered, and the mode corresponding to an "intensive use" is then immediately executed by the vehicle. This selection can be made prior to the execution of a journey or during the execution of such a journey.

Similarly, the intensive use can be planned via the human-machine interface 13 and/or a connected device for a subsequent triggering of the intensive use. The system then executes, for example, a sub-step of programming E01*b* by the user of the subsequent execution of a planned intensive use of the vehicle. Such a programming can notably be performed by stipulating an instant $t_n$, or alternatively a future location, for which the user wants the vehicle to be available for an intensive use or for an implementation of a preprogrammed intensive mode of the vehicle. The vehicle is then automatically powered upstream of such an instant $t_n$ in order to allow the execution of the method according to the invention and thus anticipate a need for heat treatment of at least one element 20 of the electric drive train 2.

Alternatively, the system can implement a sub-step of identification E01*c* of a driver and/or of a driver profile associated with an intensive use stored in the memory unit 8 of the vehicle. The identification of a driver profile can be performed by selection of a profile that is prestored, for example via the human-machine interface 13 or via a connected device as explained above. Such a profile can also be created and stored by these same means. According to an alternative that is not represented, the vehicle can also be equipped with a facial recognition unit, comprising a camera oriented towards the vehicle interior, so as to automatically identify a driver and associate it with an existing driver profile, stored on the memory unit 8.

Also, an intensive use can be automatically detected via at least one running parameter of the vehicle. The system then executes a sub-step of detection E01*d* of at least one running parameter of the vehicle out of the parameters that are characteristic of an intensive use currently being executed. The management system 6 measures, via at least one of the members 14 of the detection means 10, at least one parameter from among those mentioned above, such as the longitudinal speed of the vehicle, the acceleration and/or the slowing-down of the vehicle, the stressing of the pedals, the variation of angle of the steering wheel or the transverse acceleration, and executes a sub-step of comparison E01 of the measured values with reference values prestored on the memory unit 8 so as to be able to identify a type of use of the vehicle, that is to say so as to be able to associate or classify the measured values with a type of use of the vehicle and thus detect an intensive use.

According to a particular example of execution, not represented, the vehicle can be configured to allow an automatic activation of an "intensive" or "sport" running mode, corresponding to an intensive use of the vehicle, triggered by at least one of the parameters characteristic of an intensive use mentioned above. For example, a high longitudinal speed, notably greater than 150 km/h, a significant transverse acceleration level, notably greater than 0.4 G, a longitudinal acceleration level, notably greater than 0.6 G, a rate of depression of the accelerator pedal, notably of the order of a gradient of 10% in 0.01 s, that is to say corresponding to a maximum press of the accelerator pedal within a short time of 0.1 s, can automatically trigger the implementation of the sport mode, alone or in combination with at least one other of the abovementioned running parameters. The automatic execution of an intensive mode can then be detected by the detection means 10 or by the processing unit in a way similar to what has been explained for the manual selection of such a mode.

Moreover, the detection of an intensive use can be made automatically as a function of a journey or of a location entered by the location means 11 or, alternatively, by a connected device. The management system 6 can thus implement a sub-step of detection E01*e* of a journey or of a location specific to a current or future intensive use. In other words, the system is able to identify, for a defined journey or location, whether the latter are or are not suited to an intensive use, for example via data stored in the memory unit 8 of the vehicle or, alternatively, via data received by the communication unit 12 and coming from remote servers. For example, if a circuit or a road suited to an intensive use is detected, the system automatically detects a planned intensive use if such a location is distant.

Optionally, the automatic detection of an intensive use can be optimized via artificial intelligence means which learn to recognize the type of itinerary, via the location means 11, the type of driving or the possible performance limitations already encountered by the user in the course of the repetitions of the method according to the invention.

Thus, when an intensive use, currently being executed or planned, is detected, the method can then continue. Conversely, when no intensive use is detected, the method can be stopped E04 early so as not to requisition electric resources of the vehicle.

The system then executes a step of determination E02, notably of measurement, of at least one temperature of the at least one element 20 of the drive train 2. Such a measurement is performed via one or more sensors 9. In particular, the processing unit 7 receives temperature measurements from the electric motor 3, from the battery module 4 and/or from the electronic or mechanical members associated with one and/or the other of the motor 3 or the battery module 4. The processing unit 7 then implements a comparison of the at least one temperature with at least one target optimal operating temperature $T_c$, specific to the element concerned, so as to detect a deviation $\Delta T$ relative to the latter. The target temperature $T_c$ corresponds to at least one temperature for which the element concerned exhibits optimal performance levels, in particular optimal performance levels for an intensive use of the vehicle.

The management system 6 is then able to detect a deviation $\Delta T$ relative to the at least one target temperature $T_c$, that is to say an overshoot, by a lower or higher value, relative to said at least one target temperature $T_c$. The at least one target temperature $T_c$ can be a single temperature, corresponding to an optimal operating temperature, or, preferentially, a predefined range of temperatures corresponding to a range of temperature values for which the operation of the element concerned is optimal. The target temperature or temperatures $T_c$ are stored on the memory unit 8 and are defined according to the characteristics specific to the element concerned, for example its composition, its size or even its model. As a nonlimiting example, a battery module 4 comprising cells of Li-ion type exhibits optimal operation at temperatures lying between 20° C. and 40° C. to guarantee a good level of performance and of durability throughout its life cycle.

The target temperature or temperatures $T_c$ can be defined so as to be strictly lower than an authorized limit temperature value $T_{max}$ above which the operation of the element concerned is accompanied by a premature wear thereof. For example, such an authorized limit temperature $T_{max}$ can be of the order of 50 or 55° C. in the case of the preceding battery module 4.

It should be noted that the temperature deviation $\Delta T$ detected can be limited to only one of the elements 20 of the drive train, and not to all of them, that is to say that such a deviation $\Delta T$ can be detected only on one of the elements 20. The implementation of a heat treatment can then advantageously be targeted solely on the at least one element of the drive train requiring it when the vehicle comprises a plurality of processing systems as explained above.

It should also be noted that the at least one target temperature can be made to vary, as explained further hereinbelow, as a function of factors such as the state of health of the element concerned, or even, in the case of the battery module 4, of its state of charge.

When a deviation $\Delta T$, relative to the at least one target temperature $T_c$, is detected, the management system 6 implements a step of heat treatment E03 of the at least one element 20 so as to correct the deviation $\Delta T$ specific to each element 20 of the drive train 2, that is to say so as to return the measured temperature to a value equal, or substantially equal, to the at least one target temperature $T_c$. In other words, the processing unit 7 orders at least one of the heat treatment systems 5, 51, 52 to execute the heat treatment of one or more elements of the drive train 2 requiring it.

A similar principle is applied with reference to a range of target temperatures, the heat treatment being implemented when the measured temperature is lower than a lowest limit temperature of the range of target temperatures or when it is higher than a highest limit temperature of this same range so as to return the measured temperature to a value lying within said range.

Advantageously, when the vehicle comprises a plurality of heat treatment systems 5 as explained above, the heat treatment of the various elements 20, for example of the electric motor 3 on the one hand and of the battery module 4 on the other hand, can be executed independently and to an extent suited to its need. Such an arrangement allows for a refined heat treatment but also makes it possible to limit the energy consumption required for such a heat treatment.

Notably, when the measured temperature is lower than the at least one target temperature $T_c$ of an element concerned or than the lowest temperature of a range of target temperatures considered, the system orders the heating-up of the at least one element 20 of the drive train 2. Such is notably the case when the vehicle is "cold", following its start-up, for example for a planned intensive use. The aim is thus to promote as quickly as possible the full availability of the potential of the drive train 2 and the optimization of its efficiency.

Conversely, when the measured temperature is higher than the target temperature $T_c$, or than a highest temperature of the range of target temperatures $T_c$, of the at least one element concerned, the system orders the cooling thereof. Such is for example the case when the vehicle was already in operation since any use of the vehicle, whether this be an intensive use or other, generates a greater or lesser heating-up of the various elements 20 of the drive train 2. Thus the target is an operation of the elements of the drive train 2 with the best energy efficiency while protecting it from any so-called "derating" phenomena, corresponding to a loss of performance delivered by the element, particularly by the battery module 4, when an excessive heating takes place, notably when the element heats up beyond its authorized limit temperature $T_{max}$.

The method according to the invention advantageously makes it possible to anticipate the performance needs of an intensive use, currently being executed or planned, by adapting heat treatment of the elements 20 of the drive train 2 according to the need when an intensive use is detected. In the case of uses when cold, the method according to the invention thus advantageously makes it possible to benefit from the full performance levels of the vehicle as soon as the intensive use is launched, and thus to prolong the use thereof. In the case of uses when hot, the heat treatment of the elements 20 of the drive train 2 can be initiated early even before a heating-up likely to affect the lifetime of the elements 20 is detected, in other words a heating-up that is likely to lead to the stopping of the operation of the elements 20 concerned and/or the stopping of the use of an intensive mode. Indeed, the intensive use tends conventionally to generate a greater and faster heating-up of the elements 20 of the drive train 2. Also, the implementation of an early heat treatment advantageously makes it possible to reduce the cooling power need required on the one hand, but also to prolong the time of use of the intensive use. Such heat treatments, when hot and when cold, have the additional objective of preserving the durability of the various elements 20 of the drive train 2.

Figure 2:
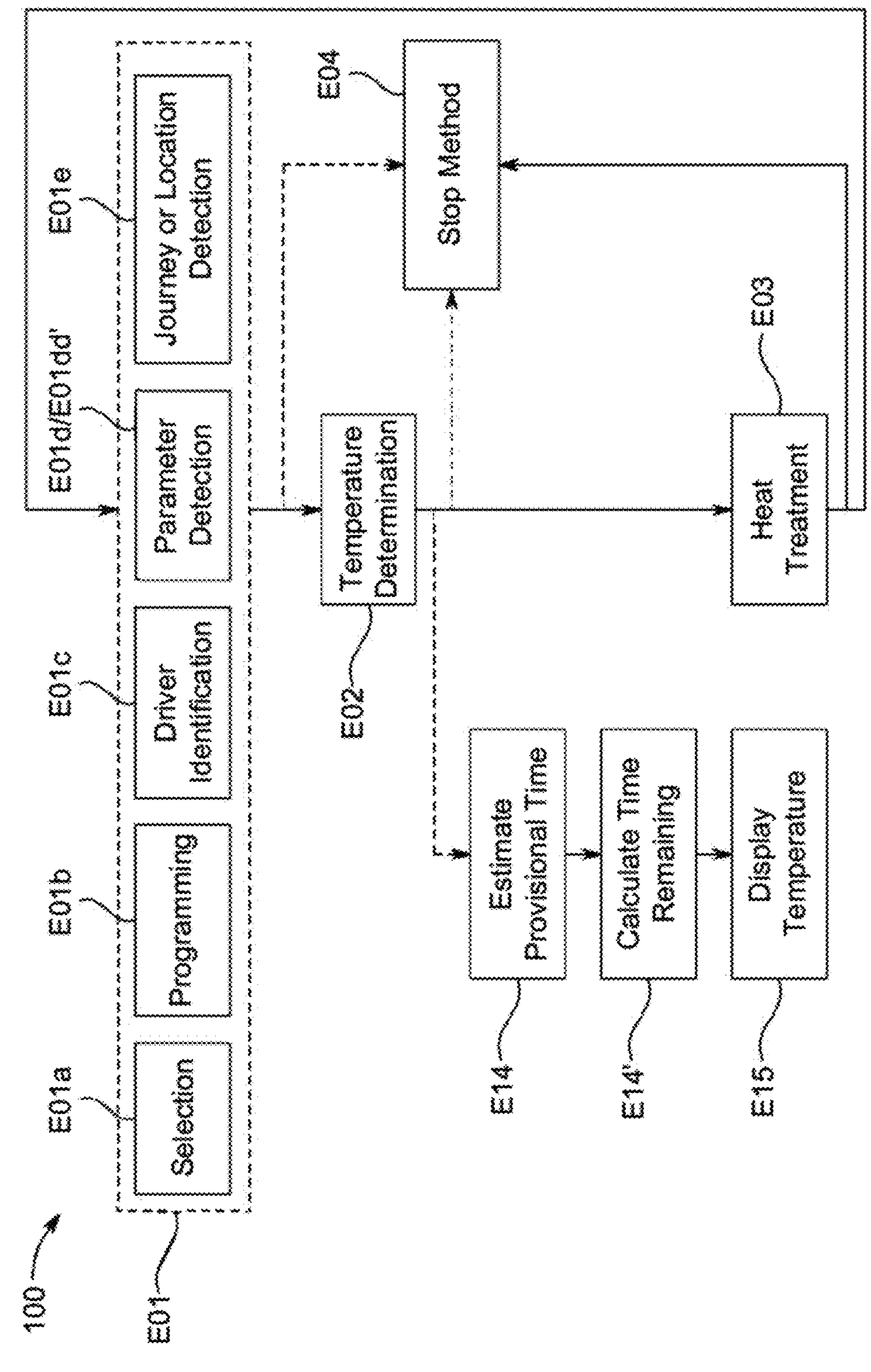
FIG. 2 is a flow diagram of a first example of execution of a heat treatment management method.

According to a particular example of execution of the method according to the invention, represented by dotted lines and by the stopping step E04 in FIG. 2, the method can be configured to be stopped early, prior to the execution of the heat treatment step E03, when the measured temperature deviation ΔT, positive or negative, is less than 2° C. In other words, the method can be configured such that the heat treatment step E03 is implemented only when an absolute value of the measured deviation is considered, by the management system 6, as being non-negligible. A similar principle applies mutatis mutandis to a range of target temperatures, the early stopping of the method being able, for example, to be defined relative to a median value of the target temperature range $T_c$ or, alternatively, with reference to the lowest value of the range in the case of a measured temperature lower than the range of target temperatures and with reference to the highest value of this same range in the case of a measured temperature higher than said range.

Furthermore, as illustrated in FIGS. 3 and 4, the execution of the heat treatment step E03 can be conditioned on various operating criteria of the vehicle.

According to a first mode of execution, the implementation of the heat treatment step E03 can be conditioned on the state of charge, initial or provisional, of the battery module 4. As illustrated in FIG. 3, the method can then comprise, prior to the execution of the heat treatment step E03, a step of determination E05 of an initial state of charge $S_i$ of the at least one battery module 4. "Initial state of charge $S_i$" is understood to mean the state of charge of the battery module 4 prior to the implementation of a heat treatment required by the at least one element 20 of the drive train 2. In the mode of execution illustrated, the execution of the heat treatment step E03 is conditioned on the initial state of charge of the battery module 4, that is to say that the method is stopped E04 early, prior to the execution of the heat treatment step E03, when the determined initial state of charge $S_i$ of the at least one battery module 4 is below a predetermined threshold $S_{i\_min}$. Such a threshold $S_{i\_min}$ is stored on the memory unit 8. It should be noted that such a threshold $S_{i\_min}$ can vary according to the type of battery module 4 concerned or even according to its size. The determination step E05 is implemented subsequent to the step of detection E01 of an intensive use. It can, according to different alternatives, be executed directly after such a detection, that is to say prior to the determination E02 of at least one temperature of at least one element of the drive train, or, conversely, after such a step E02. As a nonlimiting example, the method can be configured in such a way that the heat treatment step E03 is implemented only when the initial state of charge of the battery module is greater than 25%.

Also, optionally and according to a particular mode of execution, the implementation of the heat treatment step E03 can be conditioned on a provisional final state of charge $S_p$ of the heat treatment module. "Provisional final state of charge $S_p$" is understood to mean a calculated or estimated state of charge that notably takes into account an electrical energy consumption $C_{elec}$ required by the heat treatment system or systems 5 to implement any heat treatment necessary for the correction of a deviation ΔT. In other words, the method then comprises a step of calculation E06 of an electrical energy consumption of the electric battery module 4 required for the implementation of the heat treatment of the element or elements so as to correct the temperature deviation specific to each element 20 of the drive train 2. The method next comprises a step of estimation E07 of the provisional final state of charge $S_p$ of the at least one battery module 4 as a function of the initial state of charge $S_i$ and of the calculated electrical energy consumption $C_{elec}$. As previously, the steps E06 and E07 are implemented subsequent to the step of detection of an intensive use. They can, according to different alternatives, be executed prior to the determination E02 of at least one temperature of at least one element of the drive train, or, conversely, after such a step E02. The execution of the heat treatment step E03 can then be conditioned on the provisional final state of charge $S_p$ of the battery module 4, that is to say that the method is stopped E04 early, prior to the execution of the heat treatment step E03, when the determined provisional final state of charge $S_p$ is below a predetermined threshold $S_{p\_min}$. As a nonlimiting example, the method can be configured in such a way that the heat treatment step E03 is implemented only when the provisional final state of charge $S_p$ is greater than 20%, even greater than 25 or 30%, of the total charge of the heat treatment module. Alternatively or in combination, in the case of a current navigation, the system can be configured in such a way as to inform a user that the provisional final state of charge $S_p$ is below the predetermined threshold $S_{p\_min}$, that is to say that the level of charge of the vehicle is insufficient to make it possible to ensure that the execution of the heat treatment step E03 is maintained and allow the vehicle to reach its destination. The system can then prompt the user to stop the method according to the invention, and therefore the heat treatment step E03, early, or, alternatively, to affect the reaching of the final destination such that it will be necessary, for example, to perform a recharging of the vehicle. In other words, the system and the method according to the invention can optionally be configured such that the maintaining of the execution of the heat treatment step E03, when the determined provisional final state of charge $S_p$ is below the predetermined threshold $S_{p\_min}$, is subject to a manual intervention of the user.

Optionally, the provisional final state of charge $S_p$ can also be calculated so as to take account of the electrical energy consumption of systems embedded in the vehicle, notably the electrical consumption of the heat treatment system or systems of the vehicle interior or even of driving assistance systems with which the vehicle 1 is equipped. According to yet another option, the provisional final state of charge $S_p$ can also be calculated in order to take into account the electrical energy consumption required by the vehicle for the execution of a journey entered into the location means 11 or into a connected device.

According to one mode of execution, that can be implemented alternatively or in combination with the preceding one, the execution of the heat treatment step E03 can be conditioned on the availability of power of the at least one battery module 4 that can be allocated to the at least one heat treatment system 5. In other words, the system is capable of defining whether the vehicle benefits from the power necessary for the execution of the heat treatment of the at least one element 20 requiring it or whether, conversely, the execution of such a heat treatment is likely to impact the performance levels of ancillary systems of the vehicle, for example the availability of the "boost" function that makes it possible to access powers greater than the nominal power for a short time, the heat treatment of the vehicle interior or even the operation of a driving assistance system, and that it is therefore necessary to interrupt the method early.

In such a mode of execution, the system implements, prior to the heat treatment of the at least one element 20 of the drive train 2, a step of determination E08 of an availability of power $P_a$ of the at least one battery module 4 that can be allocated to the at least one heat treatment system 5. The availability of power $P_a$ is determined as a function of at least one parameter internal to the vehicle and/or as a function of at least one parameter external to the vehicle. For example, "internal parameter" is understood to mean a power used, in real-time, by other systems with which the vehicle is equipped, for example, in a nonlimiting manner, the heat treatment system 5 of the vehicle interior or a driving assistance system. "External parameter" is understood to mean any external parameter likely to affect the electrical energy consumption of the heat treatment system 5 of the at least one element 20 of the drive train 2, notably the temperature outside the vehicle.

The heat treatment step E03 is then configured to be implemented only when the availability of power $P_a$ of the at least one battery module 4 is above a predetermined threshold Spa. Such a threshold can be a fixed value or can be defined as a function of a total available power. For example, in a nonlimiting manner, the heat treatment step E03 is executed when the available power that can be allocated to the heat treatment system 5 is greater than 7 kW.

Optionally but preferentially, the target temperature $T_c$, the initial state of charge threshold $S_i$ and/or the provisional final charge threshold $S_p$ can be defined as a function of a state of health $S_h$, in other words a state of wear, of the battery module 4. For example, the memory unit 8 can comprise data defining, with a given state of health $S_h$ of the battery module 4, a mapping of performance levels as a function of the temperature of the battery module 4 and of the state of charge. The management system 6 can then execute, subsequent to the detection E01 of an intensive use currently being executed or planned, a step of determination E09 of the state of health of the battery module 4. The target temperatures and the thresholds transmitted to the processing unit 7 during the execution of the method according to the various preceding modes will then be able to be defined as a function of the state of health of the battery module 4. According to nonlimiting examples, the state of health $S_h$ of the battery module 4 can be determined, notably beforehand during a charging phase of said module, by the evaluation of a deviation of storage capacity (in Ah) with respect to an initial capacity, by an evaluation of the impedance, of the conductance and/or of the electrical internal resistance of the battery module 4, or even, in a discharging phase, by comparison of the rate of discharge.

Also optionally, as illustrated in FIG. 4, the management system 6 can implement a step of monitoring E10, at the same time as and/or subsequent to the heat treatment step E03, of the use of the vehicle. In other words, the management system 6 updates a state of the use of the vehicle in order to determine whether the intensive use, for example sport, is still currently being executed or is planned, or whether, conversely, such a use has been stopped or deprogrammed. Such a monitoring step E10 reprises, mutatis mutandis, the preceding description given with reference to the step of detection E01 of an intensive use. The method can advantageously be configured such that the monitoring step is executed beforehand, at the same time as or subsequent to the heat treatment step E03.

The method can thus be stopped E04 when currently being executed when no intensive use currently being executed or planned is detected.

Conversely, if an intensive use is detected, the system can optionally implement, subsequent to the heat treatment step E03:

- a step of updating E11 of the measured temperature of the at least one element 20 of the drive train 2, the method then being able to be stopped E04 if no temperature deviation is detected or if a negligible temperature deviation, as explained above, is detected; and/or
- a step of updating E12 of the initial state of charge $S_i$ of the battery module 4; and/or
- a step of updating E13 of the availability of power $P_a$ of the battery module 4.

Advantageously, when a temperature deviation $\Delta T$ is detected relative to the at least one target temperature $T_c$ for at least one of the elements 20 of the drive train 2, the management system 6 can at any moment execute a step, which is optional, of estimation E14 of a provisional time $t_p$ necessary for the at least one heat treatment system 5 to correct such a deviation $\Delta T$ and a step of calculation E14' of a time remaining $t_r$ to reach the target temperature $T_c$. These steps can be executed so as to update the provisional time and/or the time remaining in real-time or at regular time intervals. The processing unit 7 then performs such an estimation as a function of the determined deviation ΔT and can also take account of the additional parameters such as:

the parameters external to the vehicle, notably the outside temperature; and/or the parameters internal to the vehicle, notably the use or the priority of use of other systems with which the vehicle is equipped as explained above; and/or the availability of power $P_a$ of the battery module 4.

Furthermore, the management system 6 can inform the user of the progress of the method throughout the execution thereof, for example via the human-machine interface 13 of the vehicle or even via the connected device. For example, the processing unit 7 can order a step of display E15 of the measured temperature of the various elements 20 of the drive train 2 as well as the corresponding target temperature or temperatures $T_c$, the provisional time $t_p$ necessary for the heat treatment of the at least one element or the time remaining $t_r$ for such a treatment, a status of the intensive use or a status of the method according to the invention, for example depending on whether it is "currently being executed" or "stopped".

The management method and system according to the invention thus advantageously make it possible to anticipate the heat treatment of at least one element of the drive train either from the start of an intensive use, or with a view to a planned intensive use. The heat treatment of the at least one element of the drive train can thus be triggered according to different types of events and can optionally be conditioned on other parameters of the vehicle so as to regulate the impact of the method according to the invention on the ancillary equipment and systems of the vehicle. The anticipation of the increased needs for heat treatment during intensive uses allows, moreover, a heat treatment that is more effective on the one hand and that authorizes better, and more prolonged, vehicle performance levels on the other hand. The durability of the elements of the drive train is, consequently, improved thereby, since the heat treatment of the at least one element prevents the heating-up thereof to critical temperatures, particularly when prolonged, and is adapted to the temperature-setting of said elements when the vehicle is cold and an intensive use is to come.

The present invention should not however be limited to the means and embodiments described and illustrated here and it extends also to any equivalent means or embodiment and to any technically operative combination of such means inasmuch as they ultimately fulfill the functionalities described and illustrated in the present document.

The invention claimed is:

1. A method for managing heat treatment of at least one element of an electric drive train of an electric or hybrid vehicle equipped with at least one electric battery module and at least one heat treatment system of at least one of the elements of the electric drive train, the method comprising:

detecting an activation, manual or automatic, of an intensive use of the vehicle currently being executed or planned, the intensive use being a use of the vehicle during driving that requires performance of the vehicle that exceeds a normal use over a specific period of time; and when the intensive use is detected:

determining at least one temperature of the at least one element of the electric drive train and comparing the at least one temperature with at least one target optimal operating temperature specific to the at least one element of the electric drive train so as to detect a deviation relative to the at least one target temperature; and heat treating the at least one element of the electric drive train when the deviation is detected relative to the at least one target temperature specific to the at least one element of the drive train.

2. The management method as claimed in claim 1, wherein electric drive train comprises an electric motor and the at least one electric battery module.

3. The management method as claimed in claim 1, wherein the determining includes measuring the at least one temperature.

4. The management method as claimed in claim 1, further comprising:

determining an initial state of charge of the at least one battery module; and stopping the management method prior to the heat treating when the determined initial state of charge of the at least one battery module is less than a predetermined threshold.

5. The management method as claimed in claim 4, further comprising:

calculating an electrical energy consumption of the electric battery module required for the heat treatment of the at least one element so as to correct the detected deviation specific to the at least one element of the drive train;

estimating a provisional final state of charge of the at least one battery module as a function of the initial state of charge and the calculated electrical energy consumption; and stopping the management method prior to the heat treating when the calculated provisional state of charge is less than a predetermined threshold.

6. The management method as claimed in claim 1, further comprising, prior to the heat treating the at least one element of the drive train, determining an availability of power of the at least one battery module that can be allocated to the at least one heat treatment system, the availability of power being determined as a function of at least one parameter internal to the vehicle and/or as a function of at least one parameter external to the vehicle, the management method being stopped prior to the execution of the heat treating when the availability of power of the at least one battery module is less than a predetermined threshold.

7. The management method as claimed in claim 1, further comprising monitoring, at the same time as and/or subsequent to the heat treating, the use of the vehicle, the management method being stopped when no intensive use, currently being executed or planned, is detected.

8. The management method as claimed in claim 1, wherein the management method is stopped when the detected temperature deviation is less than 2° C.

9. The management method as claimed in claim 1, further comprising, when a deviation relative to the at least one target temperature is detected, estimating a provisional time necessary for the at least one heat treatment system to correct such a deviation.

10. The management method as claimed in claim 1, wherein the detecting an activation of the intensive use, currently being executed or planned, of the vehicle comprises at least one out of:

detecting a journey and/or a location specific to a current or planned intensive use via a location means of the vehicle or a connected device;

detecting at least one running parameter of the vehicle by a sensor;

selecting or programming an intensive driving mode preprogrammed in the vehicle by a user via a human-machine interface embedded in the vehicle and/or via a connected device;

programming, by the user, the subsequent execution of the planned intensive use of the vehicle via a human-machine interface embedded in the vehicle and/or via a connected device; and identifying a driver and/or of a driver profile, stored in a memory unit of the vehicle, associated with an intensive driving profile.

11. The management method as claimed in claim 10, wherein the at least one running parameter is a longitudinal speed, a stressing of a pedal, a variation of angle of a steering wheel, or a transverse acceleration characteristic of the current intensive use.

12. A hybrid or electric motor vehicle comprising:

at least one electric battery module configured to power at least one element of an electric drive train of the vehicle and at least one heat treatment system of said at least one element; and a management system comprising circuitry configured to:

detect an activation, manual or automatic, of an intensive use of the hybrid or electric motor vehicle currently being executed or planned, the intensive use being a use of the vehicle during driving that requires performance of the vehicle that exceeds a normal use over a specific period of time; and when the intensive use is detected:

determining at least one temperature of the at least one element of the electric drive train and comparing the at least one temperature with at least one target optimal operating temperature specific to the at least one element of the electric drive train so as to detect a deviation relative to the at least one target temperature; and heat treating the at least one element of the electric drive train when the deviation is detected relative to the at least one target temperature specific to the at least one element of the drive train.

13. A non-transitory computer readable medium storing a program that, when executed by a computer, causes the computer to execute:

detecting an activation, manual or automatic, of an intensive use of a hybrid or electric motor vehicle currently being executed or planned, the vehicle including an electric drive train including at least one electric battery module and at least one heat treatment system, and the intensive use being a use of the vehicle during driving that requires performance of the vehicle that exceeds a normal use over a specific period of time; and when the intensive use is detected:

determining at least one temperature of at least one element of the electric drive train and comparing the at least one temperature with at least one target optimal operating temperature specific to the at least one element of the electric drive train so as to detect a deviation relative to the at least one target temperature; and heat treating the at least one element of the electric drive train when the deviation is detected relative to the at least one target temperature specific to the at least one element of the drive train.

* * * * *